A. L. CLAWSON.
MOTION PICTURE FILM.
APPLICATION FILED APR. 8, 1909.
958,367.
Patented May 17, 1910.
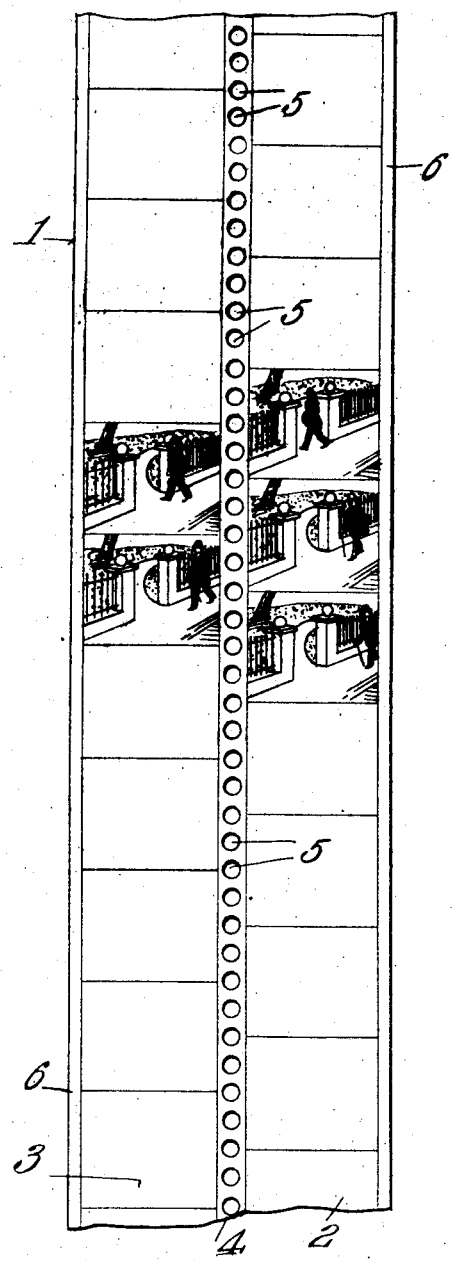
Witnesses
E. J. Stuart
F. T. Chapman.
Inventor
Abram L. Clawson.
By C. A. Snow & Co.
Attorneys

UNITED STATES PATENT OFFICE.

ABRAM L. CLAWSON, OF PLEASANT HILL, MISSOURI.

MOTION-PICTURE FILM.

958,367.  Specification of Letters Patent.  Patented May 17, 1910.

Application filed April 8, 1909. Serial No. 488,596.

*To all whom it may concern:*

Be it known that I, ABRAM L. CLAWSON, a citizen of the United States, residing at Pleasant Hill, in the county of Cass and State of Missouri, have invented a new and useful Motion-Picture Film, of which the following is a specification.

This invention has reference to improvements in motion picture films and is designed to produce a film whereon the same number of pictures may be produced with a great reduction in the length of the film so that the lineal speed of the film may be greatly reduced and the time required for rewinding the film after having been used may be correspondingly reduced. To this end the film is made as wide again, approximately, as films in ordinary use and the pictures are printed in two series longitudinal of the film but in alternate order on opposite sides of the median line of the film so that a picture on one side of the median line of the film is followed by the next picture in order on the other side of the median line of the film while the blank space of the film between the two series of pictures is utilized for the production of the longitudinal series of perforations by means of which the film is driven. With such a film the original negative is taken through two matched lenses side by side in stereoscopic arrangement and the film is alternately and intermittently exposed through these two lenses so that the finished pictures are also in stereoscopic order.

By throwing the images produced by the pictures upon a screen so that the images produced from opposite sides of the median line of the film coalesce or blend upon the screen, so far as the eye of the beholder is concerned, by being thrown upon the same portion of the screen in rapid succession alternately from one side and the other of the median line of the film, the effect produced upon the beholder is that of stereoscopic vision and consequently the moving pictures have not only the lifelike actions of motion pictures but have the added depth due to the stereoscopic impressions produced upon the beholders.

The invention will be best understood from a consideration of the following detail description taken in connection with the accompanying drawing forming a part of this specification, in which drawing there is shown a small portion of a film produced in accordance with the present invention.

The ordinary motion picture films are about an inch and a half or a little less in width while the active portion of the film is from seven-eighths of an inch to an inch in width and the separate successive pictures are each about five-eighths to three-quarters of an inch in the direction of the length of the film.

The margins of the film beyond the pictures is utilized for guiding the film, and in these margins there is usually produced a longitudinal series of perforations, each margin being so perforated, for the reception of teeth or pins projecting from the periphery of the driving wheels.

Such films are of different lengths, often reaching a thousand or more feet in length, and the films must be run at such a speed that the pictures are presented to a position of coincidence with the beam of light directed toward the screen at a comparatively high frequency, say at the rate of twenty or more pictures per second, so that, because of the persistence of vision, the separate impressions will blend in the eye of the beholder to produce the effect of a continuous moving picture agreeable to the original scene from which the series of photographs was made.

The high speed at which the film must be run is liable to produce shocks and jars in the projecting instrument, and such movements being magnified greatly on the screen, say from 150 to 200 diameters, are often quite evident in the unsteadiness of the projected pictures. Furthermore, after a film has been caused to pass by the lens the film must be rewound in the reverse direction upon the holding reel into position to be again passed by the lens when it is desired to again utilize the film.

In accordance with the present invention there is provided a film 1 about twice as wide as the ordinary film, although in practice the film need not be twice as wide as the ordinary film since the film may be as narrow as about two and one half inches for pictures of the same width as those produced upon an ordinary film of about one and one-half inches in width.

The pictures are produced upon the film in two longitudinal series 2 and 3 respectively, spaced apart by a median longitudinal portion 4 of the film in which portion 4 there is produced a longitudinal series of equally spaced perforations 5 for the reception of the peripherally projecting pins of the driving wheel of the machine.

The pictures do not extend to the margins of the film but there are left clear portions 6 at the margins of the film for guiding and supporting the said film. These marginal portions may be quite narrow.

Assuming that the series 2 of the pictures on the film contain the first picture of the entire series then this series of pictures will contain the first, third, fifth, and corresponding pictures throughout the series while the series 3 will contain the second, fourth, sixth, and corresponding pictures throughout the series. Thus the two series of pictures alternate in order while one series of pictures is displaced longitudinally of the film with relation to the other series of pictures by half the length of a picture, considering this length to be in the direction of the length of the film. Thus the pictures are arranged in alternate order on the two adjacent series and each picture of a series overlaps two pictures of the other series, except of course the first and last pictures of the combined series.

In order to produce such pictures upon a screen it is necessary that there be provided two matched lenses in the same horizontal plane but displaced one from the other laterally by the distance between the centers of the two series of pictures 2 and 3. Such structure however forms no part of the present invention and need not be further considered. The optical parts of the projecting apparatus should however be so situated as to throw the images of the two series of pictures upon the same part of the screen so that these pictures shall coalesce in the eye of the observer in the same manner as the successive pictures produced from an ordinary film, or the pictures of the ordinary dissolving stereopticon.

Considering the projecting apparatus as in operation then the first picture is thrown upon the screen and then the film is moved a distance equal to one-half the height of a picture in the direction of the length of the film and then the picture corresponding to the second picture of the entire series is thrown upon the screen from the alternate series of pictures, to be followed by the projection of the second picture of the first series on the movement of the film a distance of one-half the height of the picture so that the entire movement of the film necessary to produce three pictures in order is that of a height of a single picture.

Since the entire series of pictures is divided into two series of alternate pictures placed side by side the necessary length of film is only about one-half that necessary for the projection of the same number of individual pictures from a single film containing pictures in regular successive series.

Since the movement imparted to the film in changing from one picture to the next successive picture is only one-half that of the ordinary film, the lineal speed of the film need therefore be only one-half of that of the ordinary film thus greatly simplifying the structure and reducing the liability of such movements, though slight in themselves, which become obtrusive when highly magnified and appearing on the screen.

Since but one driving wheel is necessary, the structure is simplified to this extent and the width of the film is proportionately lessened, so that the actual amount of material in the film as compared with a continuous series film is reduced. This becomes an important item where great lengths of film are produced.

Another important feature of the invention lies in the fact that while the time period of running the film through the projection apparatus is the same as for a single series film, the speed of the mechanism is practically halved. while, because of the shortening of the film to approximately half of that of an ordinary single series film, the rewinding time need be only half that necessary for rewinding the ordinary single series film.

Another important feature of the invention is the possibility of producing stereoscopic effects upon the screen. This is due to the fact that the original negatives may be taken with lenses displaced laterally thus giving the displacement of stereoscopic pictures and when such pictures are thrown in rapid succession upon the screen the stereoscopic effect becomes enhanced and the roundness and depth characteristic of stereoscopic vision is recognized by the beholder, thus materially adding to the effectiveness of the impression given by the lifelike motions of the images produced upon the screen.

What is claimed is:—

1. A motion picture film having a central longitudinal series of perforations, motion pictures disposed in two longitudinal series on opposite sides of the central line of perforations, with the pictures of the two series alternating, said film having projecting edge portions beyond the pictures, each of less lateral extent than the width of the intermediate space containing the said perforations.

2. A motion picture film having a central longitudinal series of closely related perforations, longitudinal picture receiving portions on each side of the perforations, and plain edge portions projecting beyond the longitudinal zones for receiving the pictures, said edge portions being each of less lateral extent than the width of the intermediate space containing said perforations.

In testimony that I claim the foregoing as my own, I have hereto affixed my signature in the presence of two witnesses.

ABRAM L. CLAWSON.

Witnesses:
P. C. CLEMENTS,
S. P. M. HILL.